United States Patent [19]

Osborne

[11] Patent Number: 5,553,971
[45] Date of Patent: Sep. 10, 1996

[54] DOUBLE-CONTAINMENT UNDERGROUND PIPING SYSTEM

[75] Inventor: Keith J. Osborne, Glen Ellyn, Ill.

[73] Assignee: Intelpro Corporation, Chicago, Ill.

[21] Appl. No.: 286,893

[22] Filed: Dec. 20, 1988

[51] Int. Cl.$^6$ .................. E02D 3/00; E02B 3/16
[52] U.S. Cl. .............. 405/52; 285/133.1; 405/128; 405/154
[58] Field of Search ................ 405/52, 53, 154, 405/184, 128, 55, 157, 51, 37; 285/138, 192, 236, 93, 133.1, 365; 73/49.2 T, 49.5 R

[56] References Cited

U.S. PATENT DOCUMENTS

| | | |
|---|---|---|
| 216,286 | 6/1879 | Miller . |
| 244,752 | 7/1881 | Hunter et al. . |
| 272,833 | 2/1883 | Goodfellow . |
| 286,938 | 10/1883 | Martin . |
| 291,715 | 1/1884 | Greives et al. . |
| 430,010 | 6/1890 | Flad . |
| 470,946 | 3/1892 | Munsie . |
| 648,128 | 4/1900 | Kinniburgh . |
| 745,351 | 12/1903 | Hungerford . |
| 997,434 | 7/1911 | Barnes . |
| 1,188,446 | 6/1916 | Haines . |
| 1,375,363 | 4/1921 | Cary et al. . |
| 1,986,789 | 1/1935 | Bennett . |
| 2,050,968 | 8/1936 | Gottwald et al. . |
| 2,093,114 | 9/1937 | Sonnenfeld . |
| 2,113,204 | 4/1938 | Wasser . |
| 2,129,924 | 9/1938 | Galbraith . |
| 2,306,331 | 12/1942 | Elmer . |
| 2,325,565 | 7/1943 | Williams . |
| 2,336,150 | 12/1943 | Horvath . |
| 2,347,912 | 5/1944 | Komives . |
| 2,487,939 | 11/1949 | Norton . |
| 2,507,597 | 5/1950 | Holdridge . |
| 2,546,348 | 3/1951 | Schuman . |
| 2,956,586 | 10/1960 | Zeigler et al. ............ 285/133.1 X |
| 3,221,758 | 12/1965 | Morse . |
| 3,531,264 | 9/1970 | Greipel ............... 48/193 |
| 3,543,377 | 12/1970 | Bremner . |
| 3,559,408 | 2/1971 | Earnhart ............ 405/52 X |
| 3,672,103 | 6/1972 | Kost . |
| 3,688,801 | 9/1972 | Rohrer . |
| 3,799,440 | 3/1974 | Goss et al. .......... 239/120 |
| 3,841,671 | 10/1974 | Walker ............. 285/321 X |
| 3,995,472 | 12/1976 | Murray ............... 73/40 |
| 4,009,739 | 3/1977 | Weatherford ........ 141/59 |
| 4,010,581 | 3/1977 | Keturi et al. . |
| 4,020,641 | 5/1977 | Takada . |
| 4,062,376 | 12/1977 | McGrath . |
| 4,110,947 | 9/1978 | Murray et al. ........ 405/54 X |
| 4,149,568 | 4/1979 | Kuntz ................ 138/114 |
| 4,309,128 | 1/1982 | Williams . |
| 4,318,835 | 3/1982 | Clarke . |
| 4,449,853 | 5/1984 | Mennella et al. . |
| 4,561,292 | 12/1985 | Pugnale et al. ........ 73/49.2 |
| 4,565,351 | 1/1986 | Conti et al. . |
| 4,612,744 | 9/1986 | Shamash . |

(List continued on next page.)

FOREIGN PATENT DOCUMENTS

WO90/04157  4/1990  WIPO .

*Primary Examiner*—Dennis L. Taylor
*Attorney, Agent, or Firm*—Gerry J. Elman; Ash Tankha

[57] ABSTRACT

A coaxial piping system connected between an underground pump and an above-ground liquid dispenser is used to provide containment of the pumped liquid from the underground piping system, preventing unintended release into the environment. A pair of coaxial pipes are removably connected to the underground pump at one end and to the dispenser at the other end using quick-disconnect fittings to allow for the replacement of the piping. A primary pipe for conveying gasoline or the like is surrounded by a secondary pipe, which provides containment in the event of leakage from the primary pipe. The piping system can be tested for leaks or replaced from grade without excavating at the installed tank site. A sensor in the annular space between the primary and secondary pipes may be used to detect leakage. A path may be provided for the gravity drainage of such leaks from the secondary pipe into a containment chamber, where the liquid may be detected and removed.

48 Claims, 5 Drawing Sheets

U.S. PATENT DOCUMENTS

| | | | |
|---|---|---|---|
| 4,639,164 | 1/1987 | Pugnale et al. | 405/54 |
| 4,643,460 | 2/1987 | Lieberg | 285/365 X |
| 4,644,780 | 2/1987 | Jeter | 73/40.5 R |
| 4,667,505 | 5/1987 | Sharp | 73/40.5 R |
| 4,678,370 | 7/1987 | Allen . | |
| 4,682,911 | 7/1987 | Moreland . | |
| 4,685,831 | 8/1987 | Mahoney . | |
| 4,739,648 | 4/1988 | Horner | 73/49.2 T |
| 4,787,772 | 11/1988 | Wagner | 405/53 |
| 4,796,669 | 1/1989 | Onge . | |
| 4,796,676 | 1/1989 | Hendershot et al. | 73/49.2 TX |
| 4,805,444 | 2/1989 | Webb | 73/40.5 R |
| 4,874,268 | 10/1989 | Akesaka . | |

DOUBLE-CONTAINMENT UNDERGROUND PIPING SYSTEM

FIELD OF THE INVENTION

The present invention relates to an improved underground piping system for underground tanks used to store hydrocarbon fuels or the like.

BACKGROUND OF THE INVENTION

Studies by the United States-Environmental Protection Agency have found that approximately two-thirds of the leaks in underground storage tanks can be traced to failure of an underground piping system rather than to the tank itself. Specific locations include joints such as unions, elbows and couplings where two straight pieces of pipe are joined together, connections to underground equipment, and corroded steel pipes.

Also, structural failure in piping systems can occur when movements take place in tanks and/or piping systems due to high water tables or settling ground movement. This is particularly true in the case of rigid fiberglass piping systems which are subject to cracking or outright structural failure.

SUMMARY OF THE INVENTION

The present invention provides a piping system for conveying fluid from the outlet port of a pump to the inlet port of a fluid dispenser. The system comprises a primary pipe of flexible material having an inlet end and an outlet end, a secondary pipe of flexible material generally surrounding the primary pipe, a pump coupling removably coupled to the outlet port of the pump, a dispenser coupling removably coupled to the inlet port of the fluid dispenser, and two secondary couplings. A secondary pump coupling removably secures the pump end of the secondary pipe to an outer piping adapter of the pump coupling. A secondary dispenser coupling removably secures the dispenser end of the secondary pipe to an outer piping adapter of the dispenser coupling.

The pump coupling comprises an inner pipe in communication with the outlet port of the pump and an outer piping adapter concentric with the inner pipe. The dispenser coupling comprises an inner pipe in communication with the inlet port of the fluid dispenser and an outer piping adapter concentric with the inner pipe. The inlet end of the primary pipe is removably secured to the inner pipe of the pump coupling, and the outlet end of the pipe is removably secured to the inner pipe of the dispenser coupling.

The secondary couplings comprise a first male coupling adapted to mate with the pump end of the secondary pipe and a second male coupling adapted to mate with the dispenser end of the secondary pipe.

In accordance with the present invention, the annular volume defined by the primary pipe, the secondary pipe, the pump-body coupling, secondary pump coupling, the dispenser coupling and the secondary dispenser coupling provides containment for the fluid in the event of leakage from the primary pipe.

It is an object of the present invention to prevent or decrease the inadvertent leakage of hazardous liquid such as hydrocarbon fuel into the environment from an underground storage tank piping system.

The present invention provides a double-walled flexible piping system especially suitable for underground tanks used to store hydrocarbon fuels.

Another advantage is that the piping can be replaced without excavating or breaking ground at the installed tank site.

An additional advantage is that piping is readily accessible from grade for structural testing without excavating or breaking ground at the installed tank site.

It is a feature of the present invention that in the event of a leak of the piping the leak and virtually totally contained within the annular space between the primary and secondary pipe or in the pipe containment chamber and not discharged to the surroundings.

An additional feature of a preferred embodiment of the present invention is that a sensor placed between the walls of the two concentric pipes provides a method of detecting any release from the primary pipe, e.g. causing an alarm to sound.

An additional feature of a preferred embodiment is that any leakage from the primary pipe into the annular space between the primary and secondary pipes can be drained into a containment chamber, where it can be removed without contaminating the environment.

An additional feature of an alternative embodiment is that any leakage into the annular space between the primary and secondary pipe can be removed by suction at the dispenser connection above ground, where it can be removed without contaminating the environment.

BRIEF DESCRIPTION OF THE DRAWINGS

FIG. 4 shows an alternate embodiment of the embodiment of the invention shown in FIGS. 1 to 3.

FIG. 5 shows another alternate embodiment of the invention shown in FIGS. 1 to 3 connecting a plurality of underground storage tank systems.

DETAILED DESCRIPTION

Figure 1:
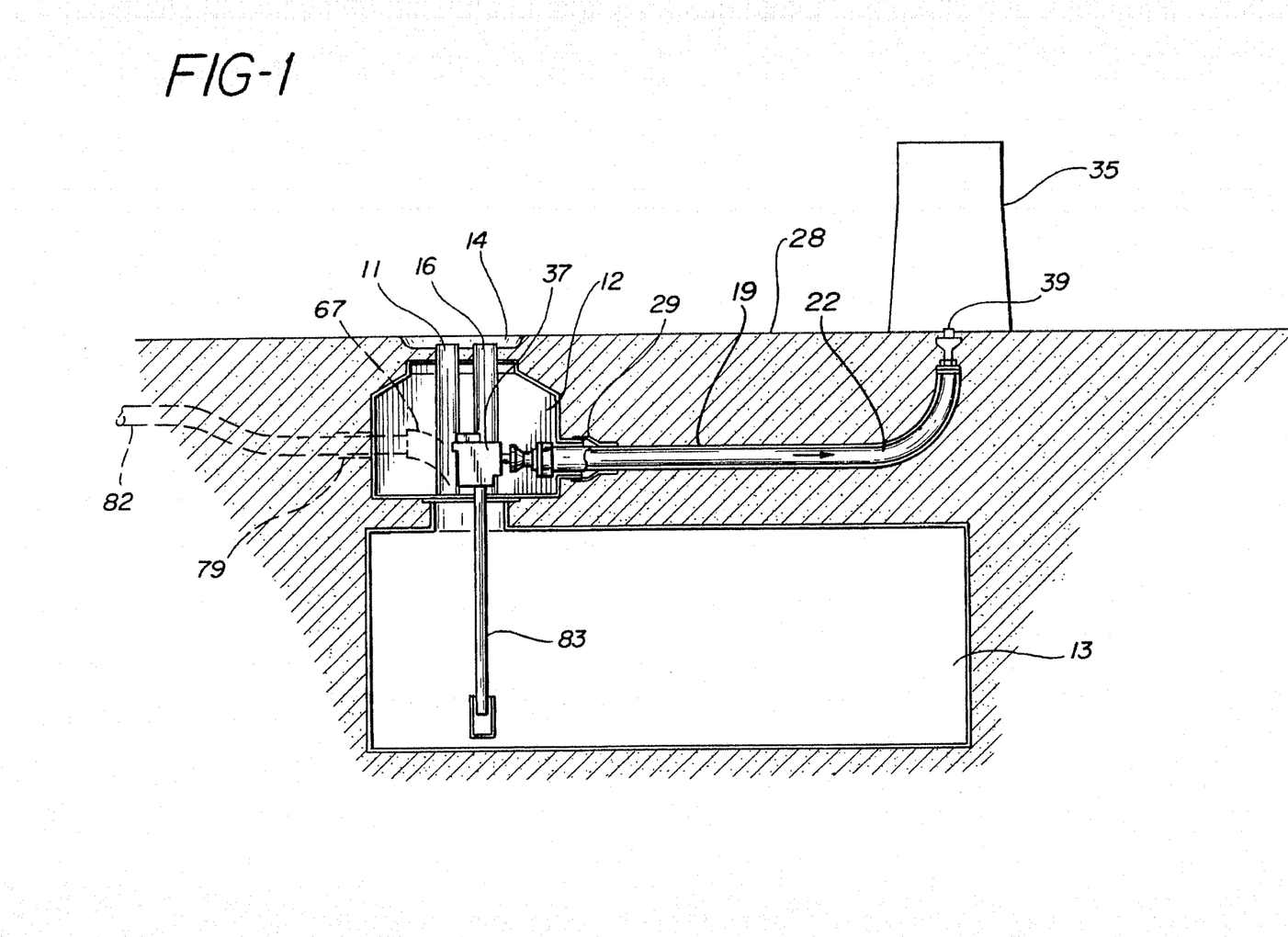
FIG. 1 is an elevational cross-section of an installed underground fuel storage tank provided with a piping system in accordance with the present invention.

FIG. 1 shows a conventional underground fuel tank 13 with a single manway 14 at grade level 28, equipped with a conventional containment chamber 12, which provides access to the pump 37 and the underground piping 19,22 connected to it. The underground tank 13 is filled with fuel by opening the manway 14 and transferring fuel to tank 13 through the fill pipe 16.

A pump 37 is provided to pump fuel from the underground tank 13 through a primary pipe 22 to a fuel dispenser coupling 39 providing input to a fuel dispenser 35. The fuel dispenser 35 may be a conventional service station gas pump. In accordance with the present invention, a secondary pipe 19 jackets the primary pipe 22 and provides containment for any fuel that might leak out of primary pipe 22.

To enter the containment chamber 12, one removes the manway cover 14, exposing the vapor recovery pipe 11 and the fill pipe 16, which can then be removed from grade level 28.

Figure 2:
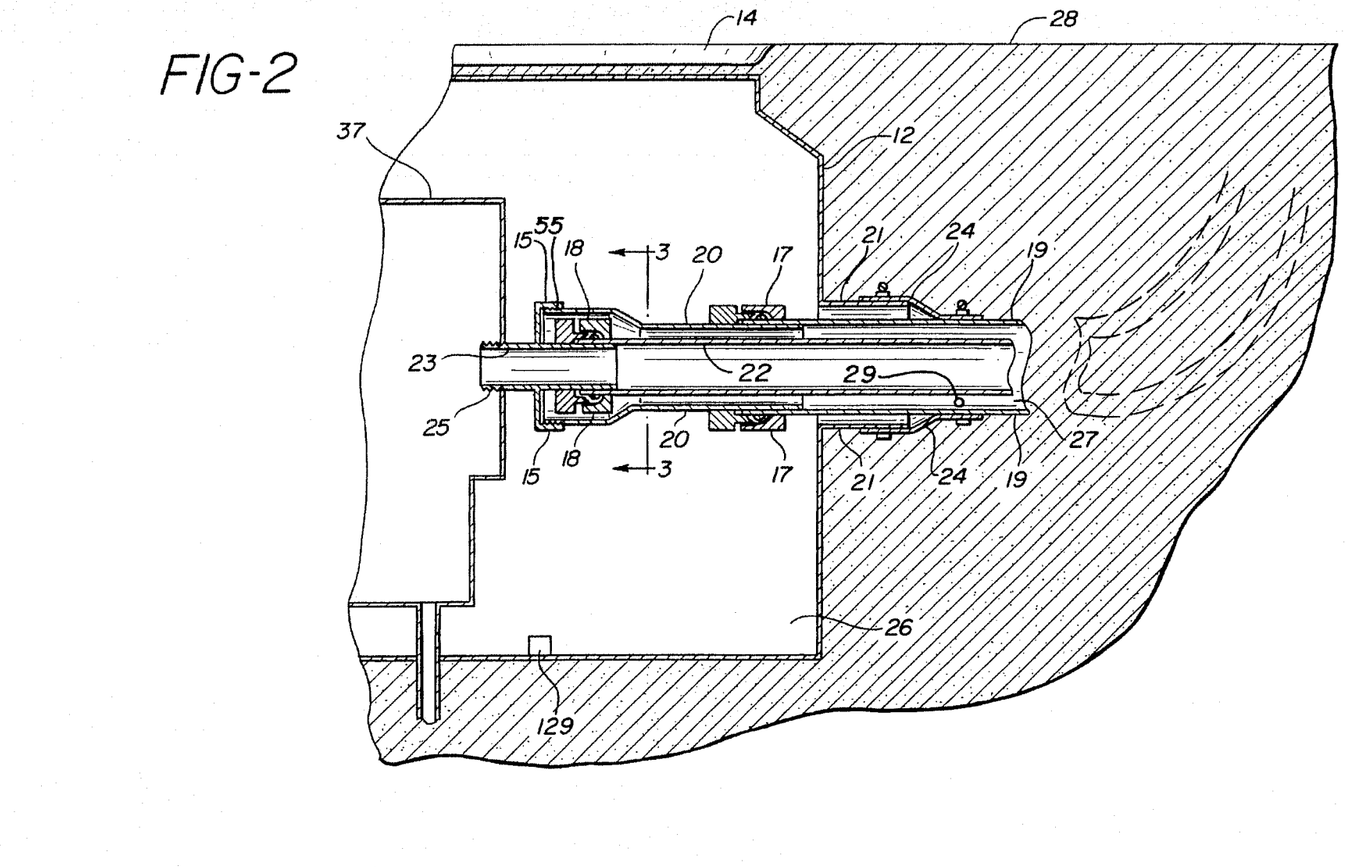
FIG. 2 is an elevational cross-section of a portion of the piping system of FIG. 1 showing in greater detail the connection of the flexible pipe with the pump body.
Figure 3:
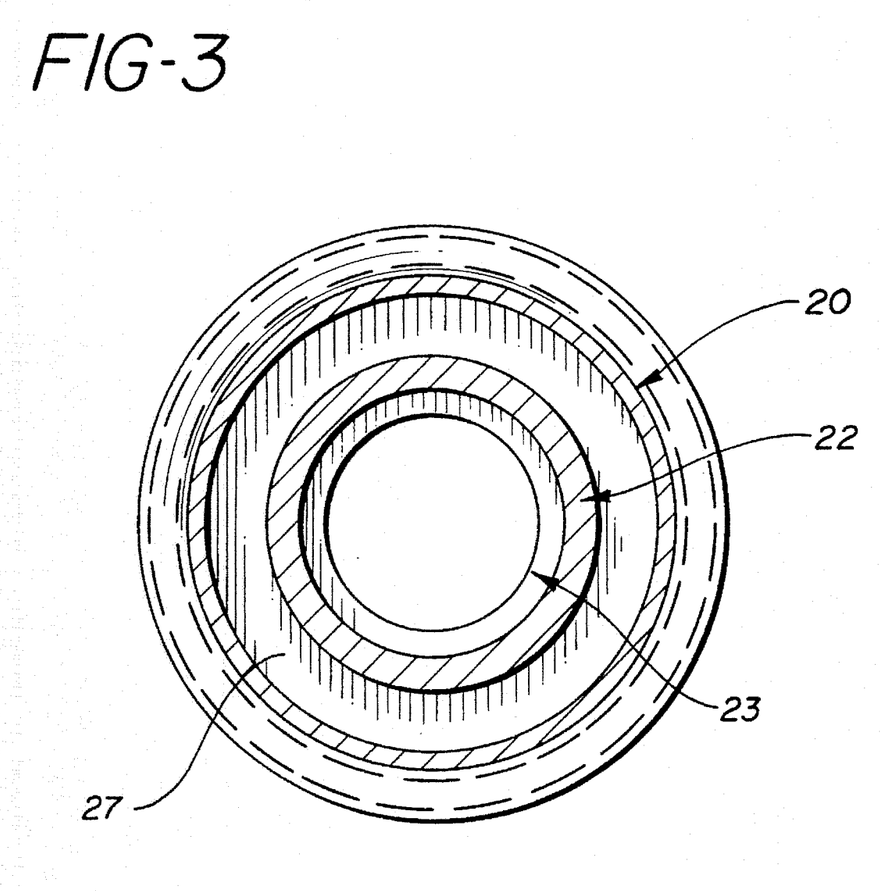
FIG. 3 is a cross-section taken along the line 3—3 of FIG. 2.

As shown in FIG. 2, the compression fittings 17, 18 for the secondary pipe 19 and the primary pipe 22 are now accessible from the containment chamber 12. The compression fitting 17 for the secondary pipe 19 is disconnected. The male-threaded coupling 20 is next unscrewed from the female-tapped outer piping adaptor 15, and the male coupling 20 is forced away from the pump and outer piping adaptor, thereby exposing the compression fitting 18 connecting the primary pipe 22 with an inner pipe 23. The compression fitting 18 can now be disconnected, thus disconnecting the primary pipe 22 and the secondary pipe 19 from the inner pipe 23 and the pump 37. The other ends of the primary pipe 22 and secondary pipe 19 are similarly disconnected from the dispenser at or about grade level 28.

The primary pipe 22 can now be "fished" or pulled up and out from the outer secondary pipe 19 from grade level. The primary pipe 22 and the secondary pipe 19 are accessible at both ends—below grade at the interface with the containment chamber, and at or about grade level at the interface with the fuel dispenser. Since the pipes 19, 22 are flexible, the pipe may be shipped to the field site where the tank is installed and cut at the job site to the desired length.

The inner pipe 23 is a forged or cast custom fitting comprising 2-inch outside diameter inner pipe connected to an outlet port of pump 37, below ground. The dispenser coupling 39 has a corresponding fitting connected to the dispenser inlet port. The flexible primary pipe 22, desirably of 2-inch inner diameter, fits over the inner pipe 23. The compression fitting 18 clamps and firmly secures the primary pipe 22 to the inner pipe 23. The length of the inner pipe 23 is typically two pipe diameters. The compression fitting 18 may be substituted with a common hose clamp, strap or other fitting.

The male coupling 20 is a 4-inch outside diameter steel pipe adapter with external threads. It screws at one threaded end 55 into the outer piping adaptor 15. The flexible secondary pipe 19 is desirably of 4-inch inside diameter hose piping. It slides over the free end of the male coupling 20. A compression fitting 17 clamps and firmly secures the secondary pipe 19 to the male coupling 20.

After installation of the flexible piping system, the secondary pipe 19 is rendered inflexible as it is buried in the ground. The secondary pipe 19 serves as a guide for the primary pipe 22 which slides into or is retractable from it.

The inner pipe 23 has a male thread 25 that screws into the outlet port of pump 37. (In some cases where the pump has a standard male connection, a standared pipe coupling may be necessary to connect the inner pipe.) Once the inner pipe 23 is screwed into the outlet port of the pump 37, the inner pipe 23 is fixed and is generally not removed.

A boot 24 is used to seal the entry of the secondary pipe, 19, where it enters the containment chamber 12 by being sealed to a sleeve 21 which is an integral part of the containment chamber 12.

If the primary pipe 22 leaks, the leakage is contained inside the outer pipe 19, and will not escape into and flood the containment chamber 11. If a leak arises at the juncture of the inner pipe 23 and pump 37, or at either of the two compression fittings 17 or 18, the presence of boot 24 ensures that the leak is contained in the piping containment chamber 12 at 26 and does not overflow into the surrounding soil. The boot 24 also prevents leakage from the fill pipe 16 from escaping from the containment chamber 12 into the soil.

The annular space between the coaxial primary pipe 22 and secondary pipe 19 can be tested for leakage in the primary pipe 22 by locating one or more sensors 29 in the annular space 27 between the pipes 22 and 19.

Accordingly there are only two locations where there are mechanical fittings in the piping run—the connection at the containment chamber 12, and the connection at the containment pan 138. In accordance with the present invention, these mechanical piping connections at which the underground pipe is likely to leak and which cannot be inspected visually from above ground are the only ones. This must be compared with prior art piping systems wherein many underground connections are employed, and which are buried and inaccessible. To reach these connections it is necessary to excavate much of the piping system in order to find a leak. Furthermore, in the event of a leak at the connection 18 between the primary pipe 22 and the inner pipe 23, coupling 18 may be snapped open and the primary pipe 22 may be replaced with a new pipe underground without disturbing the concrete slab at grade level 28. So the underground piping is replaceable from grade 28 and without requiring excavation.

In FIG. 2, containment of the liquid, in the event of a leak in the primary pipe 22, will be held in the secondary pipe 19, which serves a containment function.

Figure 4:
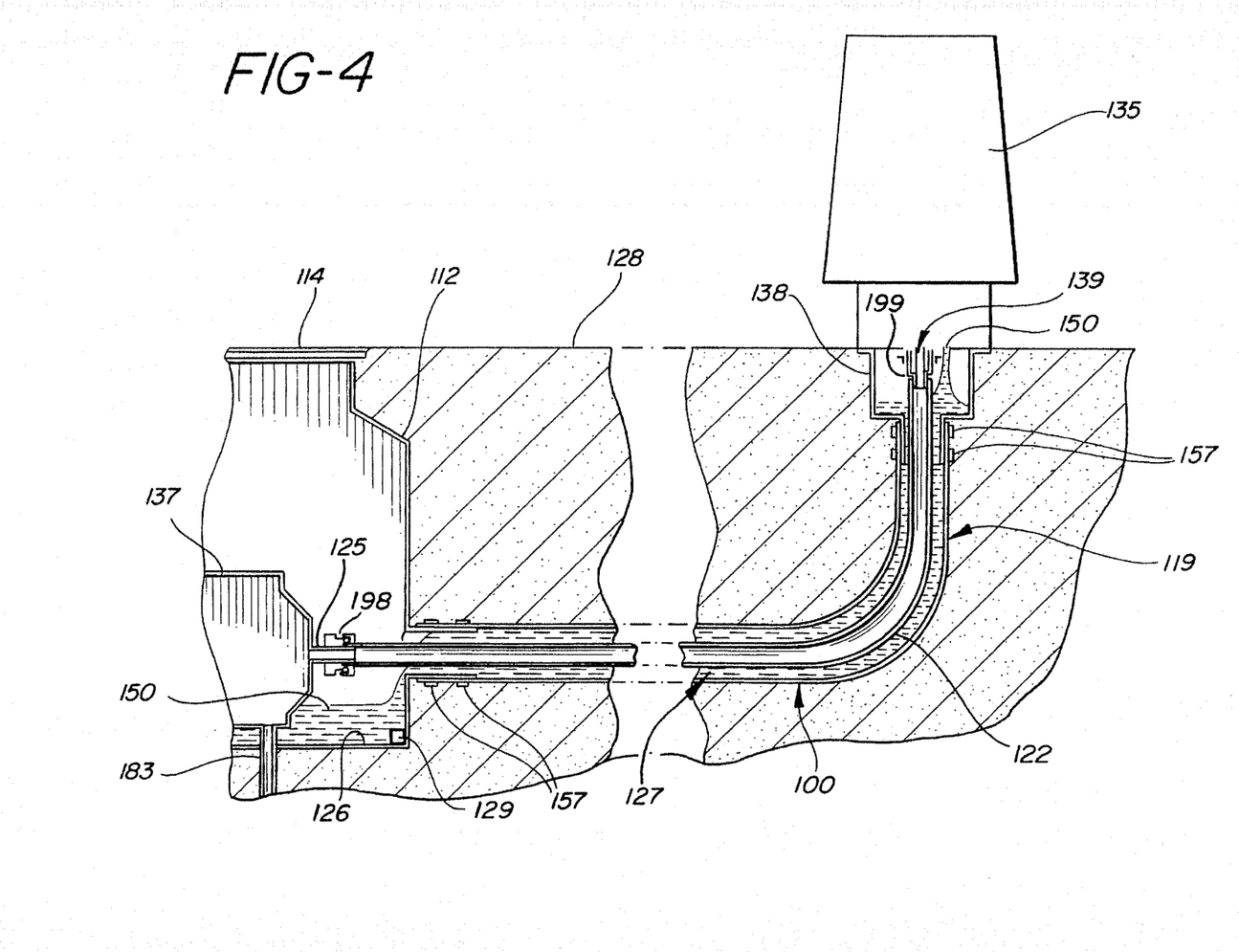
FIG. 4 is an elevational cross-section of a portion of the piping system of FIG. 1 showing in greater detail the connection of the flexible pipe with the fuel dispenser.

FIG. 4 schematically illustrates a similar gas dispensing station with an alternate embodiment for securing the primary and secondary pipes to the pump at one end and the dispenser at the other end in an underground storage tank—dispenser piping system. In FIG. 4, a leak from the primary pipe 122, which carries the product, will flow into the secondary pipe 119, which provides containment of the leak, from which it will drain by gravity to 126 in the leak containment chamber 112. The coupling 199 secures the primary pipe 122 to the bottom of the shear valve 139 at the base of the dispenser 135. This coupling 199 is substantially similar to the coupling 198 at the other end of the double piping system in the containment chamber 112. Couplings 198 and 199 may be compression fittings similar to the compression fitting 18 shown in FIG. 2. The secondary pipe 119 is connected directly to sleeves that protrude from the containment pan 138 at one end and the containment chamber 112 at the other end. The method of connection may be stainless steel straps or bands 157, applied in the field with a strap tightening tool. Alternatively, a compression fitting may be used. Access to the containment chamber 112 is provided through the manway 114.

In either of the embodiments illustrated in FIG. 2 or 4, monitoring systems are installed at the containment chamber 26 or 126 and necessary repairs can be performed without a "release" to the environment. Such monitoring systems may, for example, include one or more liquid sensors 129 at the bottom of the containment chamber 26, 126 connected to a conventional alarm system (not shown). In both the described embodiments, the primary pipe 22 or 122 can be replaced from above ground.

The material of the primary pipe 22 or 122, and the secondary pipe 19 or 119 in the two depicted embodiments is similar to the conventional 'hose' construction, i.e. reinforced rubber or plastic material suitable for gasoline service.

A gasoline delivery hose—while having a short life-span above ground—will exhibit a substantially longer life when used below ground in darkness (i.e. out of bright sunlight) and in a stationary condition, as illustrated in FIGS. 1, 2 & 4. In such use there will be no: degradation of pipe material due to exposure to sunlight; deterioration of pipe material due to wear and tear which accompanies the frequent movement of the pipes as is now the case with conventional above-ground piping systems. Under such circumstances, the life expectancy of the underground piping system shown in FIG. 1, 2 or 4 will exceed 10 years instead of the approximately 4-year average life expectancy of conventional above-ground pipe systems.

Figure 5:
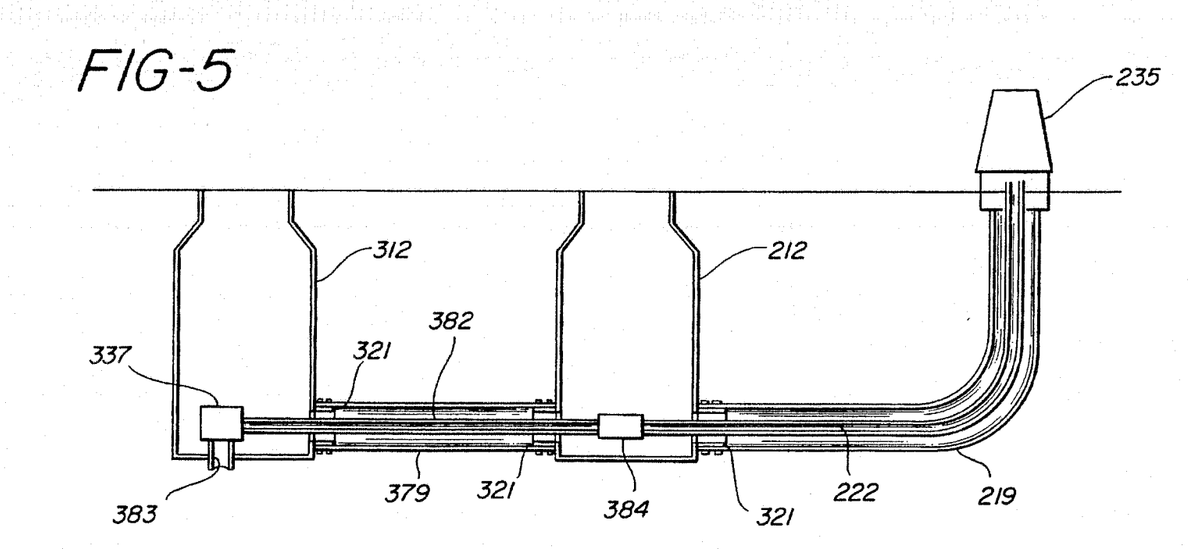
FIG. 5 is a schematic elevational cross-section of the flexible piping run/manifold connection to other underground storage tank systems.
Figure 6:
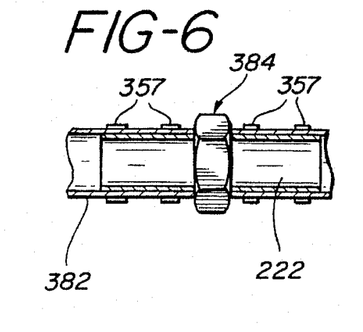
FIGS. 6 and 7 are each elevational views in cross-section showing in greater detail certain elements depicted schematically in FIG. 5.
Figure 7:
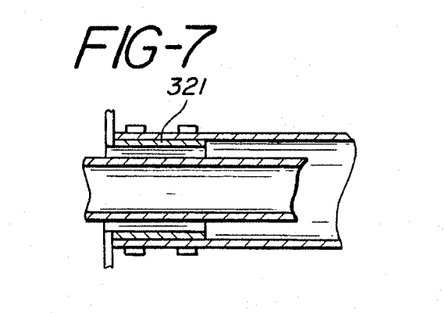

Furthermore, in the event of very long runs of pipe between the fuel storage tank and the fuel dispenser, a repeater containment chamber 212 may be placed in the pipe run. The piping containment chamber 312, the primary and secondary piping system 222 and 219, the repeater containment chamber 212 and the fuel dispenser 235 are schematically shown in FIG. 5. The use of repeater containment chambers will be necessary in cases where the length of the primary and secondary piping system delivered to the jobsite is less than the distance between the piping containment chamber 312 and the fuel dispenser 235, or if multiple fuel storage tanks are utilized and interconnectors in the piping becomes necessary. The primary and secondary pipes may consist of a plurality of pipe segments, each respective segment connected to one another so as to form a continuous primary pipe, or a continuous secondary pipe.

As shown in FIG. 5, a pump 337 having an input pipe 383 extending downwardly towards the bottom of storage tank (not shown) is within an underground containment 312. A primary pipe 382 runs from containment 312 towards a dispenser 235. However, the pipe is not long enough to run all the way to dispenser 235 and instead terminates at an in-line coupling 384. The in-line coupling 384 communicates with the primary pipe 382 on the one side and with another primary pipe 222 on the other side, joining them to form a continuous passage for fluid. Clamps 357 secure pipes 382 and 222 to the coupling 384. Any leakage from either of the joints between the in-line coupling and pipe 382 or pipe 222 is contained within containment chamber 212.

If pipe 382 should leak and need to be replaced, it can be accomplished without having to replace the entire piping between the pump 337 and the dispenser 235, and correspondingly so for pipe 222.

It is apparent that the objects of the invention are fulfilled by the foregoing disclosure. It is to be understood, however, that many modifications may be made to the basic invention, some of which have been mentioned above. These and other modifications are to be deemed within the spirit and scope of the above-disclosed invention, which should be interpreted with reference to the following Claims.

Having thus described the invention, what I desire to protect by Letters Patent and hereby claim is:

1. A piping system for conveying fluid from the outlet port of an underground pump to the inlet port of an above-ground fluid dispenser which comprises:

(a) a containment chamber installed below grade level containing the pump, said chamber comprising a body capable of containing leaked fluid, a removable cover at about grade level, and a sleeve in communication with the body extending outwardly therefrom, (b) a primary pipe of flexible material for conveying the fluid from the pump, the primary pipe having an inlet end and an outlet end, (c) means for removably securing the inlet end of the primary pipe in sealed communication with the outlet port of the pump, (d) means for removably securing the outlet end of the primary pipe in sealed communication with the inlet port of the fluid dispenser, (e) a secondary pipe of flexible material generally surrounding the primary pipe, said secondary pipe having a lower end and an upper end, the lower end of the secondary pipe being in sealed communication with the containment chamber sleeve, said inner surface of the secondary pipe and said outer surface of the primary pipe defining an annular space, (f) a dispenser pan installed below the fluid dispenser and the fluid dispenser inlet port so as to contain leakage therefrom, said dispenser pan comprising a body and a pan sleeve in communication with the pan in a gravity draining relationship therefrom, the upper end of the secondary pipe being in sealed communication with the pan sleeve, and (g) a repeater chamber installed below grade level and comprising a body capable of containing leaked fluid, a removable cover at about grade level and a pair of sleeves in communication with the body extending outwardly therefrom, the primary pipe passing through said repeater chamber sleeves and the secondary pipe comprising a plurality of secondary pipe segments, wherein respective ends of secondary pipe segments are in sealed communication with each of said repeater chamber sleeves, the dispenser pan sleeve, and the containment chamber sleeve, wherein the primary pipe comprises a plurality of primary pipe segments, and a coupling joining in sealed communication each contiguous pair of said primary pipe segments, each of said couplings being generally surrounded by a repeater chamber as recited above in paragraph (g), whereby fluid leaked into the dispenser pan or the annular space between the primary pipe and the secondary pipe may travel within the annular space and is contained within the system, and whereby the primary pipe may be replaced by removing the cover from the containment chamber and uncovering the dispenser pan, unsecuring each end of said primary pipe, and pulling said primary pipe out through said sleeves.

2. The piping system of claim 1 wherein the means (c) for removably securing the inlet end of the primary pipe comprises a compression fitting.

3. The piping system of claim 1 wherein the means (d) for removably securing the outlet end of the primary pipe comprises a compression fitting.

4. The piping system of claim 1 wherein the means (c) for removably securing the inlet end of the primary pipe and the means (d) for removably securing the outlet end of the primary pipe each comprise compression fittings.

5. A piping system for conveying fluid from the outlet port of an underground pump to the inlet port of an above-ground fluid dispenser which comprises:

(a) a containment chamber installed below grade level containing the pump, said chamber comprising a body capable of containing leaked fluid, a removable cover at about grade level, and a sleeve in communication with the body extending outwardly therefrom, (b) a primary pipe of flexible material for conveying the fluid from the pump, the primary pipe having an inlet end and an outlet end and comprising a plurality of primary pipe segments joined together at their ends in sealed communication by fittings, (c) means for removably securing the inlet end of the primary pipe in sealed communication with the outlet port of the pump, (d) means for removably securing the outlet end of the primary pipe in sealed communication with the inlet port of the fluid dispenser, (e) a secondary pipe of flexible material generally surrounding the primary pipe, said secondary pipe having a lower end and an upper end and comprising a plurality of secondary pipe segments, the lower end of the secondary pipe being in sealed communication with the containment chamber sleeve, said inner surface of the secondary pipe and said outer surface of the primary pipe defining an annular space, (f) a dispenser pan installed below the fluid dispenser and the fluid dispenser inlet port so as to contain leakage therefrom, said dispenser pan comprising a body and a pan sleeve in communication with the pan in a gravity draining relationship therefrom, the upper end of the secondary pipe being in sealed communication with the pan sleeve, and (g) a repeater chamber installed below grade level and comprising a body capable of containing leaked fluid, a removable cover at about grade level and a plurality of sleeves in communication with the body extending outwardly therefrom, the primary pipe passing through said repeater chamber sleeves and comprising a plurality of primary pipe segments and a coupling joining in sealed communication each contiguous pair of said primary pipe segments, each of said couplings being generally surrounded by a repeater chamber as recited above in paragraph (g), and respective ends of secondary pipe segments being in sealed communication with each of said repeater chamber sleeves, the dispenser pan sleeve, and the containment chamber sleeve, whereby fluid leaked into the dispenser pan or the annular space between the primary pipe and the secondary pipe may travel within the annular space and is contained within the system, and whereby a primary pipe segment may be replaced by removing the cover from the containment chamber, unsecuring each end of said primary pipe segment, and pulling said primary pipe out through the sleeves.

6. The piping system of claim 1, further comprising a liquid sensor in the annular space between the primary pipe and the secondary pipe.

7. The piping system of claim 1, further comprising a liquid sensor in the containment chamber.

8. A secondarily contained piping system comprising:

(a) a flexible inner supply pipe (b) an outer secondary containment pipe (c) two spaced underground access chambers which are interconnected in a fluid tight manner through the side wall just above the chamber base, by the secondary containment pipe, (d) all flexible inner supply pipe couplings and associated fittings being disposed within the access chambers, (e) a fluid source providing an originating interface to the flexible inner supply pipe, (f) a fluid outlet providing a terminating interface to the flexible inner supply pipe, (g) the access chambers being of sufficient size to permit manual or mechanical removal or replacement of the flexible inner supply pipe, (h) the flexible inner supply pipe having sufficient bend radius to be removed and replaced through the access chambers, (i) all components of the system being chemically compatible with and impervious to the fluids to be transmitted and with the surrounding environment in which they are disposed, (j) the flexible inner supply pipe and its associated couplings and fittings being of sufficient strength to withstand internal fluid pressures, and (k) the access chambers and secondary containment pipe being of sufficient strength to withstand external loads.

9. The secondarily contained piping system as set forth in claim 8, wherein:

(a) the ratio of the inner diameter of the flexible inner supply pipe to the inner diameter of the outer secondary containment pipe is at least approximately 2 to 4.

10. The secondarily contained piping system as set forth in claim 8, wherein:

(a) a sealing assembly interconnects the access chamber at the end of the secondary containment pipe.

11. The secondarily contained piping system as set forth in claim 10, wherein:

(a) each access chamber has a side wall integral outwardly extending annular cuff surrounding an opening through which the secondary containment pipe extends.

12. The secondarily contained piping system as set forth in claim 11, wherein:

(a) a resilient sealing sleeve is compressively held in tight sealing engagement with the secondary containment pipe and with the annular cuff.

13. The secondarily contained piping system as set forth in claim 8, wherein:

(a) the originating and terminating interfaces are couplings or fittings.

14. The secondarily contained piping system as set forth in claim 8, wherein:

(a) the fluid source includes a second flexible supply pipe which is connected in series to the flexible inner supply pipe through a fitting.

15. The secondarily contained piping system as set forth in claim 8, wherein:

(a) the terminating interface is connected to a fuel dispensing unit.

16. The secondarily contained piping system as set forth in claim 8, wherein:

(a) the terminating interface is a fitting which is connected to another flexible inner supply pipe.

17. The secondarily contained piping system as set forth in claim 8, wherein:

(a) the bend radius of the secondary containment pipe is greater than the bend radius of the flexible inner supply pipe.

18. The secondarily contained piping system as set forth in claim 8, wherein:

(a) the access chamber permits the flexible supply pipe to bend.

19. The secondarily contained piping system as set forth in claim 8, wherein:

(a) after installation of the piping system, the outer secondary containment pipe is rendered inflexible.

20. The secondarily contained piping system as set forth in claim 8, wherein:

(a) the secondary containment pipe is made of reinforced rubber or plastic material.

21. The secondarily contained piping system as set forth in claim 8, wherein:

(a) the access chambers interconnected with the secondary containment pipe provide a fluid tight means of secondary containment for the flexible inner supply pipe contained within.

22. The secondarily contained piping system as set forth in claim 8, wherein:

(a) the access chamber interconnected with the secondary containment pipe provides isolation of the inner contained components from corrosive and degradative elements in the surrounding environment.

23. The secondarily contained piping system as set forth in claim 8, wherein:

(a) the secondary containment pipe is inclined to the horizontal to provide drainage toward a given one of said two spaced underground access chambers.

24. The secondarily contained piping system as set forth in claim 8, wherein:

(a) the containment pipe is a flexible pipe of sufficient diameter and clearance from the flexible supply pipe to permit a bend in the line without requiring an elbow.

25. The secondarily contained piping system as set forth in claim 8, wherein:

(a) a fluid sensing means is disposed within the space between the inner supply pipe and the outer containment pipe.

26. The secondarily contained piping system as set forth in claim 20, wherein:

(a) the containment pipe is a flexible pipe.

27. The secondarily contained piping system as set forth in claim 8, wherein:

(a) the secondary containment pipe is made from a flexible plastic material.

28. A secondarily contained pipe routing system for fluid fuel dispensers comprising:

(a) a plurality of flexible fluid supply pipe sections removably interconnected at their ends by coupling fittings to form a linear plural section fluid supply line, (b) at least one of the coupling fittings of the supply pipe sections being a fluid tight fitting which provides a connection to a fluid fuel dispenser, (c) the terminating coupling fitting being a fluid tight fuel dispenser coupling, (d) an access chamber for each coupling fitting which provides a housing through which the plurality of flexible fluid supply pipe sections extend such that each coupling fitting is disposed in an access chamber, (e) the flexible supply pipe sections are each capable of being disposed in a continuous curvilinear path, (f) a flexible secondary containment pipe enclosing each flexible supply pipe section and providing adequate clearance therefrom to permit movement of its corresponding supply pipe section therethrough, (g) each end of all secondary containment pipes being interconnected in tight sealing engagement with the corresponding one of the two access chambers, (h) each access chamber having an access opening at the top thereof below which the corresponding coupling fitting joining adjacent fluid supply pipe sections is disposed, (i) the access chambers each having a height and width sufficient to permit introduction and removal of the flexible supply pipe sections from their respective secondary containment pipes within the bending radius limits of the supply pipe sections, and (j) a fluid fuel dispenser mounted on at least one of the access chambers and positioned immediately above the access opening and above and connected to the corresponding coupling fitting.

29. The pipe routing system as set forth in claim 28, wherein:

(a) at least one leak sensing device is disposed in the space between one of the supply pipe sections and the corresponding containment pipe.

30. The secondarily contained fluid distribution system as set forth in claim 28, wherein:

(a) at least one of the access chambers is located beneath a fuel dispenser and (b) a fuel dispenser coupling is located in said at least one of the access chambers.

31. The secondarily contained fluid distribution system as set forth in claim 28, wherein:

(a) at least one of the access chambers is located beneath a fuel dispenser and (b) at least one of the access chambers is not located beneath a fuel dispenser.

32. A secondarily contained piping system, comprising:

(a) a series of sealed linearly spaced access chambers which are disposed below ground and each of which has a removable access opening at ground level, (b) at least one of the access chambers having a side wall with two substantially opposed secondary containment pipe receiving openings, (c) the side walls adjacent each opening having an engaging element adjacent thereof for engaging an end of a secondary containment pipe, (d) a flexible secondary containment pipe interconnecting adjacent access chambers and interconnected at each end with a corresponding secondary containment pipe receiving opening and interengaging the adjacent engaging element of the access chamber side walls to thereby provide a sealed linear multiple segmented secondary containment pipe line, (e) a flexible inner fluid pipe section disposed within each secondary containment pipe which extends at each end thereof through the corresponding one of the secondary containment pipe receiving openings and into the corresponding access chamber, (f) each flexible inner fluid pipe section having a coupling element at each end which interengages another coupling element to thereby provide an inner pipe removal coupling which is disposed within the common access chamber, (g) the flexible inner supply pipe sections and their associated coupling elements and fittings being of sufficient strength to withstand internal fluid pressures, and (h) the secondary containment pipes each having a substantially larger diameter than that of the associated flexible inner fluid pipe section, whereby the inner fluid pipe sections can be removed from an adjacent access chamber after uncoupling.

33. The secondarily contained piping system as set forth in claim 32, wherein:

(a) the secondary containment pipe is a flexible pipe which can be disposed in a curvilinear line.

34. The secondarily contained piping system as set forth in claim 33, wherein:

(a) the connecting element for the secondary containment pipe is an annular cuff and tightening band assembly.

35. A secondarily contained fluid distribution system, comprising:

(a) a plurality of access chambers;

(b) a secondary containment pipe having a plurality of segments, a first of said segments extending between a first and a second of said plurality of access chambers and a second of said segments extending between the second and a third of said access chambers;

(c) a primary containment pipe extending through said secondary containment pipe from said first through said second to said third access chamber, said primary containment pipe being flexible and having a plurality of segments;

(d) a disconnectable fittings securing adjacent segments of said primary containment pipe together in end to end relationship, at least one of said access chambers having at least one of said disconnectable fittings located therein;

(e) the flexibility of said primary containment pipes and the configuration of said access chambers being such that, upon disconnection of the two of said disconnectable fittings securing opposite ends of a single segment of said primary containment pipe, said segment may be withdrawn from said secondary containment pipe through one of said access chambers for inspection and/or replacement.

36. A secondarily contained fluid distribution system for supplying fuel to at least one fuel dispenser, comprising:

(a) a plurality of access chambers;

(b) a secondary containment pipe extending in series between said access chambers;

(c) a flexible primary containment pipe extending in series through said secondary containment pipe;

(d) a plurality of disconnectable fittings in said primary containment pipe, said disconnectable fittings connecting segments of said primary containment pipe, at least one of said disconnectable fittings being located in a corresponding one of said access chambers;

(e) the flexibility of said primary containment pipe and the configuration of at least one of said access chambers being such that, upon disconnection of two of said disconnectable fittings, a segment of said primary containment pipe may be withdrawn through an access chamber to an above ground location and a substitute segment inserted through said access chamber; and (f) at least one fuel dispenser associated with a corresponding one of said access chambers and being in fluid communication with the primary containment pipe within said corresponding one of said access chamber.

37. A secondarily contained fluid distribution system for supplying fuel to at least one fuel dispenser, comprising:

(a) at least one liquid fuel dispensing unit for supplying fuel to motor vehicles, (b) a plurality of underground access chambers, one of said underground access chambers being disposed beneath said at least one liquid fuel dispensing unit for receiving the end of at least one fuel supply pipe section, each of said underground access chambers having an open top adjacent ground level and at least one fuel line receiving opening, (c) an underground secondary containment pipe interconnecting adjacent access chambers, the ends of said underground secondary containment pipe interconnecting the fuel line receiving openings in each interconnected access chamber to provide a fluid tight system, (d) the access chambers being interconnected by the secondary containment pipes to form a fluid tight series configured distribution routing line, (e) the first access chamber having a fuel line opening interconnected with said underground secondary containment pipe and a corresponding fuel supply pipe section, (f) the last such interconnected access chamber having a single fuel line opening, and all of the remaining access chambers having two fuel line openings in their side walls, (g) a flexible fuel supply pipe disposed within and extending the length of each interconnecting secondary containment pipe, said flexible fuel supply pipes being sized to provide sufficient clearance to permit them to be readily moved through the corresponding ones of said secondary containment pipes, (h) each one of the flexible fuel supply pipes extending through the fuel line receiving openings of the interconnected access chambers, (i) a disconnectable fitting disposed on each end of one of the fluid fuel supply pipes and in each intermediately positioned access chamber, said disconnectable fitting interconnecting the adjacent opposed ends of adjacent ones of said flexible fluid supply pipes disposed within each access chamber, (j) a disconnectable fitting disposed in the last access chamber for connecting the end of the flexible fuel supply pipe disposed therein to said at least one liquid fuel dispensing unit, and (k) the relative dimensions of the access chambers and the containment pipes with respect to the size and minimum bending radius of the flexible fuel supply pipes being sufficient to permit uncoupling of any given flexible fuel supply pipe at its ends and the removal and subsequent replacement thereof.

38. The secondarily contained fuel distribution system as set forth in claim 37, wherein:

(a) at least one of the underground secondary containment pipes is flexible and does not follow a straight path.

39. The secondarily contained fluid fuel distribution system as set forth in claim 38, wherein:

(a) the bent flexible containment pipe interconnecting two adjacent access chambers is bent to change the direction of the flow approximately 90 degrees.

40. The secondarily contained fluid fuel distribution system, as set forth in claim 37, wherein:

(a) the secondary containment pipes are of sufficiently large size to permit substitution of larger diameter flexible fuel supply pipes.

41. The secondarily contained fluid fuel distribution system as set forth in claim 38, wherein:

(a) the secondary containment pipes are made of reinforced rubber or plastic material.

42. The secondarily contained fluid distribution system as set forth in claim 38, wherein:

(a) at least some access chambers include a cuff member integral with the side wall of the access chamber adjacent the fuel line receiving opening, and (b) a resilient cylindrical sealing element is disposed in contact with the cuff member for interengaging the adjacent end of the secondary containment pipe.

43. The secondarily contained fluid distribution system, as set forth in claim 42, wherein:

(a) a first tightening means is disposed about the resilient cylindrical sealing element to circumferentially compress it into firm locking engagement with the cuff member, and (b) a second tightening means is disposed about the resilient cylindrical sealing element to circumferentially compress it into firm locking engagement with the corresponding one of said underground secondary containment pipes.

44. The secondarily contained fluid distribution system, as set forth in claim 42, wherein:

(a) each cuff member extends outwardly from the corresponding access chamber wall.

45. The secondarily contained fluid distribution system, as set forth in claim 42, wherein:

(a) the minimum clearance between the point where each flexible fluid supply pipe enters the corresponding access chamber and the opposite chamber wall is greater than the bend radius of the flexible fluid supply pipe.

46. The secondarily contained fluid distribution system, as set forth in claim 42, wherein:

(a) a leak detection means is disposed within the space between at least some of the underground secondary containment pipes and the corresponding flexible fuel supply pipe.

47. The secondarily contained fluid distribution system, as set forth in claim 46, wherein:

(a) the leak detection means includes a fluid sensor.

48. The secondarily contained fluid distribution system, as set forth in claim 42, wherein:

(a) the ratio of the inner diameter of the flexible fuel supply pipe to the inner diameter of the underground secondary containment pipe is at least approximately 2 to 4.

\* \* \* \* \*

(12) EX PARTE REEXAMINATION CERTIFICATE (8190th)
United States Patent
Osborne (10) Number: US 5,553,971 C1
(45) Certificate Issued: *May 3, 2011

(54) DOUBLE CONTAINMENT UNDERGROUND PIPING SYSTEM

(75) Inventor: Keith J. Osborne, Glen Ellyn, IL (US)

(73) Assignee: Pisces by OPW, Inc., Cincinnati, OH (US)

Reexamination Request:
No. 90/010,611, Sep. 8, 2009

Reexamination Certificate for:
Patent No.: 5,553,971
Issued: Sep. 10, 1996
Appl. No.: 07/286,893
Filed: Dec. 20, 1988

(*) Notice: This patent is subject to a terminal disclaimer.

(51) Int. Cl.
*F16L 39/00* (2006.01)
*F16L 1/00* (2006.01)
*F16L 1/028* (2006.01)
*F16L 1/036* (2006.01)
*E02D 3/00* (2006.01)
*E02B 3/16* (2006.01)

(52) U.S. Cl. .............. 405/52; 405/154.1; 405/129.5; 405/129.55

(58) Field of Classification Search .............. None
See application file for complete search history.

(56) References Cited

U.S. PATENT DOCUMENTS

| | | |
|---|---|---|
| 216,286 A | 6/1879 | Miller |
| 244,752 A | 7/1881 | Hunter et al. |
| 272,833 A | 2/1883 | Goodfellow |
| 286,938 A | 10/1883 | Martin |
| 291,715 A | 1/1884 | Geives et al. |
| 430,010 A | 6/1890 | Flad |
| 470,946 A | 3/1892 | Munsie |
| 648,128 A | 4/1900 | Kinniburgh |
| 745,351 A | 12/1903 | Hungerford |
| 997,434 A | 7/1911 | Barnes |
| 1,188,446 A | 6/1916 | Haines |
| 1,375,363 A | 4/1921 | Cary et al. |
| 1,986,789 A | 1/1935 | Bennett |

(Continued)

FOREIGN PATENT DOCUMENTS

| | | |
|---|---|---|
| EP | 0207015 A3 | 12/1986 |
| EP | 0207015 A2 | 12/1986 |
| GB | 1374874 | 11/1974 |

(Continued)

OTHER PUBLICATIONS

Literature entitled, "ke Rohrsysteme und Umwelttechnik, FLEXWELL®—Saugleitung im Tankstellenbau," (3 pages) in German (Oct. 1987).

Product Information for Piping Sumps, by Owens–Corning Fiberglas Corp., Pub. No. 3–PE–13703 and 3–PE–13704, various sheets (6 pages) (Dec. 1985).

"Catalog for Concrete Professionals," by Concraft Supply, Inc., 7823 Loisdale Rd., Springfield, VA, 22150; 4 pages.

(Continued)

*Primary Examiner*—Patricia L Engle (57) ABSTRACT

A coaxial piping system connected between an underground pump and an above-ground liquid dispenser is used to provide containment of the pumped liquid from the underground piping system, preventing unintended release into the environment. A pair of coaxial pipes are removably connected to the underground pump at one end and to the dispenser at the other end using quick-disconnect fittings to allow for the replacement of the piping. A primary pipe for conveying gasoline or the like is surrounded by a secondary pipe, which provides containment in the event of leakage from the primary pipe. The piping system can be tested for leaks or replaced from grade without excavating at the installed tank site. A sensor in the annular space between the primary and secondary pipes may be used to detect leakage. A path may be provided for the gravity drainage of such leaks from the secondary pipe into a containment chamber, where the liquid may be detected and removed.

U.S. PATENT DOCUMENTS

| | | |
|---|---|---|
| 2,050,968 A | 8/1936 | Gottwald et al. |
| 2,093,114 A | 9/1937 | Sommenfeld |
| 2,113,204 A | 4/1938 | Wasser |
| 2,129,924 A | 9/1938 | Galbraith |
| 2,268,263 A | 12/1941 | Newell et al. |
| 2,306,331 A | 12/1942 | Elmer |
| 2,325,565 A | 7/1943 | Williams |
| 2,336,150 A | 12/1943 | Horvath |
| 2,347,912 A | 5/1944 | Komives |
| 2,487,939 A | 11/1949 | Norton |
| 2,507,597 A | 5/1950 | Holdridge |
| 2,546,348 A | 3/1951 | Schuman |
| 2,956,586 A | 10/1960 | Zeigler et al. |
| 3,221,758 A | 12/1965 | Morse |
| 3,299,417 A | 1/1967 | Sibthorpe |
| 3,379,027 A | 4/1968 | Mowell et al. |
| 3,531,264 A | 9/1970 | Greipel |
| 3,543,377 A | 12/1970 | Bremner |
| 3,559,408 A | 2/1971 | Earnhart |
| 3,672,103 A | 6/1972 | Kost |
| 3,688,801 A | 9/1972 | Rohrer |
| 3,721,270 A | 3/1973 | Wittgenstein |
| 3,799,440 A | 3/1974 | Goss et al. |
| 3,841,671 A | 10/1974 | Walker |
| 3,850,457 A | 11/1974 | Bigotte et al. |
| 3,974,862 A | 8/1976 | Fuhrmann |
| 3,980,112 A | 9/1976 | Basham |
| 3,995,472 A | 12/1976 | Murray |
| 4,009,739 A | 3/1977 | Weatherford |
| 4,010,581 A | 3/1977 | Keturi et al. |
| 4,020,641 A | 5/1977 | Takada |
| 4,049,480 A | 9/1977 | Kutschke |
| 4,062,376 A | 12/1977 | McGrath |
| 4,094,536 A | 6/1978 | Cole et al. |
| 4,110,947 A | 9/1978 | Murray et al. |
| 4,127,286 A | 11/1978 | Albertsen |
| 4,132,083 A | 1/1979 | McGrath |
| 4,149,568 A | 4/1979 | Kuntz et al. |
| 4,159,027 A | 6/1979 | Caillet |
| 4,274,549 A | 6/1981 | Germain |
| 4,309,128 A | 1/1982 | Williams |
| 4,315,408 A | 2/1982 | Karl |
| 4,318,835 A | 3/1982 | Clarke |
| 4,411,290 A | 10/1983 | Heath |
| 4,449,853 A | 5/1984 | Mennella et al. |
| 4,457,349 A | 7/1984 | Vazin |
| 4,472,911 A | 9/1984 | Jooris et al. |
| 4,519,634 A | 5/1985 | Hand |
| 4,561,292 A | 12/1985 | Pugnale et al. |
| 4,565,351 A | 1/1986 | Conti et al. |
| 4,612,744 A | 9/1986 | Shamash |
| 4,619,555 A | 10/1986 | Skinner et al. |
| 4,639,164 A | 1/1987 | Pugnale et al. |
| 4,643,460 A | 2/1987 | Lieberg |
| 4,644,780 A | 2/1987 | Jeter |
| 4,667,505 A | 5/1987 | Sharp |
| 4,678,370 A | 7/1987 | Allen |
| 4,682,911 A | 7/1987 | Moreland |
| 4,685,831 A | 8/1987 | Mahoney |
| 4,702,645 A | 10/1987 | Skinner et al. |
| 4,739,648 A | 4/1988 | Horner |
| 4,770,562 A | 9/1988 | Muller et al. |
| 4,778,310 A | 10/1988 | Moreland |
| 4,787,772 A | 11/1988 | Wagner |
| 4,796,669 A | 1/1989 | Onge |
| 4,796,676 A | 1/1989 | Hendershot et al. |
| 4,805,444 A | 2/1989 | Webb |
| 4,874,268 A | 10/1989 | Akesaka |
| 4,886,304 A | 12/1989 | Kunsman |
| 4,912,966 A | 4/1990 | Sharp |
| 4,932,257 A | 6/1990 | Webb |
| 4,971,477 A | 11/1990 | Webb et al. |
| 4,991,626 A | 2/1991 | Grantham |
| 5,005,613 A | 4/1991 | Stanley |
| 5,042,537 A | 8/1991 | Grantham |
| 5,098,221 A | 3/1992 | Osborne |
| 5,553,971 A | 9/1996 | Osborne |
| 5,567,083 A | 10/1996 | Osborne |
| 5,590,981 A | 1/1997 | Osborne |
| 6,116,817 A | 9/2000 | Osborne |

FOREIGN PATENT DOCUMENTS

| | | |
|---|---|---|
| GB | 1390280 | 4/1975 |
| GB | 2023296 | 12/1979 |
| JP | 51-003055 | 1/1976 |
| JP | 57-011800 | 1/1982 |
| JP | 57-146126 | 9/1982 |
| JP | 62-23000 | 2/1987 |
| JP | SHO 62-23000 | 2/1987 |
| JP | 62-200630 | 12/1987 |
| WO | 90/04157 | 4/1990 |

OTHER PUBLICATIONS

Information Disclosure Statement, U.S. Appl. No. 09/085,747; 3 pages (Sep. 19, 1999).

Information Disclosure Statement, U.S. Appl. No. 09/084,747; 4 pages (May 19, 1999).

Information Disclosure Statement, U.S. Appl. No. 09/084,747; 4 pages (Oct. 12, 1999).

Environmental Protection Agency, Proposed Rules, 40 CFR Part 280, Underground Storage Tanks; Technical Requirements, Apr. 17, 1987, p. 1–286.

ID
EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3 and 5 is confirmed.

Claims 4, 7, 34, 41, 43, 47 and 48 are cancelled.

Claims 6, 8, 28, 32, 33 and 35-37 are determined to be patentable as amended.

Claims 10-16, 19-22, 24-27, 29 and 38-40, dependent on an amended claim, are determined to be patentable.

New claims 49-55 are added and determined to be patentable.

Claims 9, 17, 18, 23, 30, 31, 42 and 44-46 were not reexamined.

6. The piping system of claim 1, further comprising a liquid sensor in the annular space between the primary pipe and the secondary pipe *and a liquid sensor in the containment chamber*.

8. A secondarily contained piping system comprising:
(a) a flexible inner supply pipe,
(b) an outer secondary containment pipe,
(c) two spaced underground access chambers which are interconnected in a fluid tight manner through the side wall just above the chamber base, by the secondary containment pipe, *wherein said inner supply pipe includes a plurality of segments, each segment being fluidly coupled to an adjacent segment by an intermediate coupling, and wherein the system further includes a plurality of intermediate underground chambers, each intermediate coupling being positioned in one of said intermediate underground chambers*,
(d) all flexible inner supply pipe couplings and associated fittings being disposed within the access chambers,
(e) a fluid source providing an originating interface to the flexible inner supply pipe,
(f) a fluid outlet providing a terminating interface to the flexible inner supply pipe,
(g) the access chambers being of sufficient size to permit manual or mechanical removal or replacement of the flexible inner supply pipe,
(h) the flexible inner supply pipe having sufficient bend radius to be removed and replaced through the access chambers,
(i) all components of the system being chemically compatible with and impervious to the fluids to be transmitted and with the surrounding environment in which they are disposed,
(j) the flexible inner supply pipe and its associated couplings and fittings being of sufficient strength to withstand internal fluid pressures, and
(k) the access chambers and secondary containment pipe being of sufficient strength to withstand external loads.

28. A secondarily contained pipe routing system for fluid fuel dispensers comprising:
(a) a plurality of flexible fluid supply pipe sections removably interconnected at their ends by coupling fittings to form a linear plural section fluid supply line,
(b) at least one of the coupling fittings of the supply pipe sections being a fluid tight fitting which provides a connection to a fluid fuel dispenser,
(c) the terminating coupling fitting being a fluid tight fuel dispenser coupling,
(d) an access chamber for each coupling fitting which provides a housing through which the plurality of flexible fluid supply pipe sections extend such that each coupling fitting is disposed in an access chamber,
(e) the flexible supply pipe sections are each capable of being disposed in a continuous curvilinear path,
(f) a flexible secondary containment pipe enclosing each flexible supply pipe section and providing adequate clearance therefrom to permit movement of its corresponding supply pipe section therethrough,
(g) each end of all secondary containment pipes being interconnected in tight sealing engagement with the corresponding one of the two access chambers,
(h) each access chamber having an access opening at the top thereof below which the corresponding coupling fitting joining adjacent fluid supply pipe sections is disposed,
(i) the access chambers each having a height and width sufficient to permit introduction and removal of the flexible supply pipe sections from their respective secondary containment pipes within the bending radius limits of the supply pipe sections, and
(j) a fluid fuel dispenser mounted on at least one of the access chambers and positioned immediately above the access opening and above and connected to the corresponding coupling fitting, *and wherein at least one of said coupling fittings is positioned within said secondary containment pipe*.

32. A secondarily contained piping system, comprising:
(a) a series of sealed linearly spaced access chambers which are disposed below ground and each of which has a removable access opening at ground level,
(b) at least one of the access chambers having a side wall with two substantially opposed secondary containment pipe receiving openings,
(c) the side walls adjacent each opening having an engaging element adjacent thereof for engaging an end of a secondary containment pipe,
(d) a flexible secondary containment pipe interconnecting adjacent access chambers and interconnected at each end with a corresponding secondary containment pipe receiving opening and interengaging the adjacent engaging element of the access chamber side walls to thereby provide a sealed linear multiple segmented secondary containment pipe line,
(e) a flexible inner fluid pipe section disposed within each secondary containment pipe which extends at each end thereof through the corresponding one of the secondary containment pipe receiving openings and into the corresponding access chamber,
(f) each flexible inner fluid pipe section having a coupling element at each end which interengages another coupling element to thereby provide an inner pipe removal coupling which is disposed within the common access chamber, (g) the flexible inner supply pipe sections and their associated coupling elements and fittings being of sufficient strength to withstand internal fluid pressures, and (h) the secondary containment pipes each having a substantially larger diameter than that of the associated flexible inner fluid pipe section, whereby the inner fluid pipe sections can be removed from an adjacent access chamber after uncoupling, *wherein said inner fluid pipe includes a plurality of segments, each segment being fluidly coupled to an adjacent segment by an intermediate coupling, and wherein the system further includes a plurality of intermediate underground chambers, each intermediate coupling being positioned in one of said intermediate underground chambers, and wherein the system further includes an underground pump positioned in one of said access chambers and being fluidly coupled to said inner fluid pipe.*

33. The secondarily contained piping system as set forth in claim 32, wherein:

[(a)] the secondary containment pipe is a flexible pipe which can be disposed in a curvilinear line *and the connecting element for the secondary containment pipe is an annular cuff and tightening band assembly.*

35. A secondarily contained fluid distribution system, comprising:

(a) a plurality of access chambers;

(b) a secondary containment pipe having a plurality of segments, a first of said segments extending between a first and a second of said plurality of access chambers and a second of said segments extending between the second and a third of said access chambers, *wherein the secondary containment pipe is fluidly isolated from said access chambers*;

(c) a primary containment pipe extending through said secondary containment pipe from said first through said second to said third access chamber, said primary containment pipe being flexible and having a plurality of segments;

(d) a disconnectable fittings securing adjacent segments of said primary containment pipe together in end to end relationship, [at least one of said] *said first, second and third* access chambers *each* having at least one of said disconnectable fittings located therein;

(e) the flexibility of said primary containment pipes and the configuration of said access chambers being such that, upon disconnection of the two of said disconnectable fittings securing opposite ends of a single segment of said primary containment pipe, said segment may be withdrawn from said secondary containment pipe through one of said access chambers for inspection and/or replacement.

36. A secondarily contained fluid distribution system for supplying fuel to at least one fuel dispenser, comprising:

(a) a plurality of access chambers;

(b) a secondary containment pipe extending in series between said access chambers;

(c) a flexible primary containment pipe extending in series through said secondary containment pipe;

(d) a plurality of disconnectable fittings in said primary containment pipe, said disconnectable fittings connecting segments of said primary containment pipe, [at least one] *each* of said disconnectable fittings being located in a corresponding one of said access chambers;

(e) the flexibility of said primary containment pipe and the configuration of at least one of said access chambers being such that, upon disconnection of two of said disconnectable fittings, a segment of said primary containment pipe may be withdrawn through an access chamber to an above ground location and a substitute segment inserted through said access chamber; and (f) at least one fuel dispenser associated with a corresponding one of said access chambers and being in fluid communication with the primary containment pipe within said corresponding one of said access chamber.

37. A secondarily contained fluid distribution system for supplying fuel to at least one fuel dispenser, comprising:

(a) at least one liquid fuel dispensing unit for supplying fuel to motor vehicles, (b) a plurality of underground access chambers, one of said underground access chambers being disposed beneath said at least one liquid fuel dispensing unit for receiving the end of at least one fuel supply pipe section, each of said underground access chambers having an open top adjacent ground level and at least one fuel line receiving opening, *wherein each access chamber is configured to contain leaked fuel without contaminating the surrounding environment,*

(c) an underground secondary containment pipe interconnecting adjacent access chambers, the ends of said underground secondary containment pipe interconnecting the fuel line receiving openings in each interconnected access chamber to provide a fluid tight system, (d) the access chambers being interconnected by the secondary containment pipes to form a fluid tight series configured distribution routing line, (e) the first access chamber having a fuel line opening interconnected with said underground secondary containment pipe and a corresponding fuel supply pipe section, (f) the last such interconnected access chamber having a single fuel line opening, and all of the remaining access chambers having two fuel line openings in their side walls, (g) a flexible fuel supply pipe disposed within and extending the length of each interconnecting secondary containment pipe, said flexible fuel supply pipes being sized to provide sufficient clearance to permit them to be readily moved through the corresponding ones of said secondary containment pipes, (h) each one of the flexible fuel supply pipes extending through the fuel line receiving openings of the interconnected access chambers, (i) a disconnectable fitting disposed on each end of one of the fluid fuel supply pipes and in each intermediately positioned access chamber, said disconnectable fitting interconnecting the adjacent oposed ends of adjacent ones of said flexible fluid supply pipes disposed within each access chamber, (j) a disconnectable fitting disposed in the last access chamber for connecting the end of the flexible fuel supply pipe disposed therein to said at least one liquid fuel dispensing unit, and (k) the relative dimensions of the access chambers and the containment pipes with respect to the size and minimum bending radius of the flexible fuel supply pipes being sufficient to permit uncoupling of any given flexible fuel supply pipe at its ends and the removal and subsequent replacement thereof.

49. The secondarily contained piping system as set forth in claim 8 further comprising an underground pump positioned in one of said access chambers and being fluidly coupled to said inner supply pipe by said fluid source fitting.

50. The secondarily contained piping system as set forth in claim 8 wherein the secondary containment pipe is fluidly isolated from said access chambers.

51. The secondarily contained piping system as set forth in claim 8 wherein each access chamber is configured to contain fluid leaked from said inner supply pipe without contaminating the surrounding environment.

52. The secondarily contained piping system as set forth in claim 8 wherein said secondary containment pipe includes an end positioned adjacent to at least one of said access chambers, wherein said end is positioned lower relative to other portions of said secondary containment pipe thereof to enable gravity draining therethrough into one of said access chambers.

53. The secondarily contained piping system as set forth in claim 8 wherein at least one of said couplings is positioned within said secondary containment pipe.

54. The secondarily contained piping system as set forth in claim 8 wherein each of said coupling and fittings are positioned within said secondary containment pipe.

55. The secondarily contained piping system as set forth in claim 8 wherein at least one access chamber is configured to contain fluid leaked from said inner supply pipe without contaminating the surrounding environment.

\* \* \* \* \*